(12) United States Patent
Schwitalla et al.

(10) Patent No.: US 11,831,454 B2
(45) Date of Patent: Nov. 28, 2023

(54) FULL DOME CONFERENCE

(71) Applicant: Christopher Max Schwitalla, Berlin (DE)

(72) Inventors: Christopher Max Schwitalla, Berlin (DE); Sergiy Prokofyev, Berlin (DE)

(73) Assignee: Christopher Max Schwitalla, Berlin (DE)

( * ) Notice: Subject to any disclaimer, the term of this patent is extended or adjusted under 35 U.S.C. 154(b) by 0 days.

(21) Appl. No.: 17/557,359

(22) Filed: Dec. 21, 2021

(65) Prior Publication Data
US 2022/0200815 A1 Jun. 23, 2022

(30) Foreign Application Priority Data

Dec. 21, 2020 (EP) .................................... 20215969

(51) Int. Cl.
*G06F 15/16* (2006.01)
*H04L 12/18* (2006.01)

(52) U.S. Cl.
CPC ...... *H04L 12/1822* (2013.01); *H04L 12/1818* (2013.01); *H04L 12/1831* (2013.01)

(58) Field of Classification Search
None
See application file for complete search history.

(56) References Cited

U.S. PATENT DOCUMENTS

| 7,136,090 B1 | 11/2006 | McDuffie |
| 8,259,153 B1 | 9/2012 | Campbell, III et al. |
| 10,015,444 B1* | 7/2018 | Bakshi ................. H04N 9/3179 |
| 11,425,283 B1* | 8/2022 | Thurston, III ....... H04N 5/2226 |
| 2006/0181607 A1 | 8/2006 | McNelley et al. |
| 2008/0266380 A1 | 10/2008 | Gorzynski et al. |
| 2011/0018981 A1 | 1/2011 | White |
| 2011/0216153 A1* | 9/2011 | Tasker ..................... H04N 7/15 348/E7.083 |
| 2018/0356718 A1 | 12/2018 | Nashida et al. |
| 2021/0203878 A1* | 7/2021 | Lee ..................... H04L 12/1831 |
| 2022/0237946 A1* | 7/2022 | Voss ................... H04N 21/4788 |
| 2022/0277629 A1* | 9/2022 | Siu ........................ H04B 5/0031 |
| 2022/0291778 A1* | 9/2022 | Williams .............. G06F 3/0446 |
| 2022/0303629 A1* | 9/2022 | Gilson .................... G06T 15/20 |
| 2023/0231970 A1 | 7/2023 | Ohligs |

FOREIGN PATENT DOCUMENTS

| CN | 217285100 U * | 8/2022 | |
| DE | 102020003522 A1 | 12/2021 | |
| EP | 3550404 A1 | 10/2019 | |
| WO | WO-2022098466 A1 * | 5/2022 | .......... G06F 3/1446 |
| WO | WO-2022175825 A1 * | 8/2022 | |

\* cited by examiner

*Primary Examiner* — Phyllis A Book
(74) *Attorney, Agent, or Firm* — MaxGoLaw PLLC

(57) ABSTRACT

A method for an immersive spatial visual telecommunication is provided that includes audio and video capturing devices and a spherical visual display (physical or virtual) surrounding the local user or multiple users, who can now interact (standing or seated) inside one common virtual space—which is generated by virtually interconnecting the spaces within the spherical visual displays in different locations—with multiple other remote users, who are using the same software and hardware setup. The scale of the setup can vary: the smallest setup allows for 2-8 users (max. 2 users in each location) to interact in 2-4 different locations whereby the bigger the setup is, the more users in more locations can participate.

15 Claims, 6 Drawing Sheets

FULL DOME CONFERENCE

RELATED APPLICATIONS

This application claims priority benefit of EPO Application Serial Number 20 215 969.5 filed 21 Dec. 2020, the contents of which are hereby incorporated by reference.

FIELD OF THE INVENTION

The invention relates to a method for an immersive spatial visual telecommunication comprising audio and video capturing devices and a spherical visual display (physical or virtual) surrounding the local user or multiple users, who can now interact (standing or seated) inside one common virtual space—which is generated by virtually interconnecting the spaces within the spherical visual displays in different locations—with multiple other remote users, who are using the same software and hardware setup. The scale of the setup can vary: the smallest setup allows for 2-8 users (max. 2 users in each location) to interact in 2-4 different locations whereby the bigger the setup is, the more users in more locations can participate.

BACKGROUND OF THE INVENTION

Videoconferencing is attractive for geographically distributed team collaboration, specifically to avoid traveling and to increase flexibility. Among other things, this is particularly beneficial for the environment in terms of $CO_2$ emissions.

In addition, virtual conferences are of great importance for business, especially in times of a pandemic situation, since face-to-face contact must be largely avoided for an extended period of time in order to prevent the spread of the pandemic agent/pathogen.

The solutions disclosed in the prior art via Skype conference and/or Zoom conference or similar software via an internet-enabled device are poorly suited for such a virtual meeting. Video conferences are displayed on a two-dimensional screen, which cannot convey the feeling of a real conference. The conference participants often lose concentration because, for example, they cannot fully engage psychologically in the conference and are distracted by background noise and/or objects

Task of the Invention

The task of the invention was therefore to eliminate the disadvantages of the state of the art and to provide means which simulate a physical conference as well as possible.

SUMMARY OF THE INVENTION

The task according to the invention is solved by the features of the independent claims. Advantageous embodiments of the invention are described in the dependent claims.

The invention relates to a method for an immersive spatial visual telecommunication comprising audio and video capturing devices and a spherical visual display (physical or virtual) surrounding the local user or multiple users, who can now interact (standing or seated) inside one common virtual space—which is generated by virtually interconnecting the spaces within the spherical visual displays in different locations—with multiple other remote users, who are using the same software and hardware setup. The scale of the setup can vary: the smallest setup allows for 2-8 users (max. 2 users in each location) to interact in 2-4 different locations whereby the bigger the setup is, the more users in more locations can participate.

In a preferred embodiment the invention relates to a conference room for a spatial visual telecommunication and/or conducting virtual conferences for 2-8 users (max. 2 users in each location) seated in 2-4 different locations comprising: a video capture device, a visual display device, an audio system, a user interface, a local server, a remote server, a composting software characterized in that the conference room comprises a dome and a base, wherein the dome is placed on the base and oriented at an inclined angle the visual display device is configured to display a video and/or image signal on an inner surface of the dome (e.g. projection screen and projectors, dome shaped LED screen) the capture device is configured to generate a video and/or an image signal from the inside of the conference room the audio system is configured to capture an audio signal from the inside of the conference room and/or to output an audio signal within the conference room the local server is configured to process, store, and transmit data, wherein the local server is in data communication with the capture device, the display device, the audio system, the user interface, and/or a remote server.

In another preferred embodiment the conference room is characterized in that the dome comprises a projection screen and a support frame, preferably an aluminum frame wherein an inner surface of the dome functions as the projection screen wherein the dome has a diameter of ca. 2.5 m and is installed with an angle of ca. 30 degrees.

Preferably, the angle, particularly tilt angle, or a range of the angle can be adjusted according to the visual content.

Terms such as circa (ca.), approximately (approx.), about, etc. preferably describe a tolerance range of less than ±40%, preferably less than ±20%, more preferably less than ±10%, even more preferably less than ±5%, and especially less than ±1%, and always include the exact value. Similar preferably describes quantities that are approximately equal.

In another preferred embodiment the conference room is characterized in that the visual display device comprises a projector, wherein the projector is configured to project a video and/or an image onto the projection screen.

In another preferred embodiment the conference room is characterized in that the base is formed as a hollow cylinder and has an inwardly facing side and an outwardly facing side, wherein the inwardly facing side has a chroma key screen wherein the base is preferably designed as an obliquely cut circular cylinder wherein the base has an opening to enter the room.

In another preferred embodiment the conference room is characterized in that the video capture device comprises a camera, wherein the conference room comprises preferably three cameras which are orientated to capture a defined area within the conference room from different defined viewing angles.

In another preferred embodiment the conference room is characterized in that the audio system comprises at least a microphone and speakers suitable for surround sound, preferably a 5.1 audio system.

In another preferred embodiment the conference room is characterized in that the user interface comprises a device selected from the group consisting of tablet computer, laptop, smartphone, cell phone and/or desktop computer.

In another preferred embodiment the conference room is characterized in that the conference room comprises a table and a chair, wherein the table is shaped as a quarter circle.

Furthermore, the invention relates to a System for a spatial visual telecommunication and/or conducting virtual conferences comprising two or more of conference rooms described above and a remote server.

In another preferred embodiment the System is characterized in that the conference rooms are in data communication with the remote server to generate one virtual consolidated conference room.

In another preferred embodiment the System is characterized in that the remote server is configured to implement the captured video and/or audio data of each conference room (1) in a virtual environment in real time so that a virtual conference is generated.

In another preferred embodiment the System is characterized in that the remote server is configured to transmit data associated with the virtual conference to each conference room, wherein the projectors of each conference room are configured to display the virtual environment and/or video data captured in the conference rooms on the projection screen and the audio system of each conference room configured to output audio signal captured in the conference rooms.

Furthermore, the invention relates to a Method for a spatial visual telecommunication and/or conducting virtual conferences comprising the following steps:
- capture video and audio data by a capture device and/or audio system in at least two conference rooms described above,
- transmit the captured data via a local server to a remote server,
- implement the captured data in a virtual environment by the remote server to form a virtual conference room, and
- distributing the generated virtual conference data to each conference room described above that is in data communication with the remote server.

The average person skilled in the art recognizes that explanations, benefits, and definition apply equally to the method, conference, and system, and vice versa.

Further Explanations

Video conferences connect people, but these meetings are still limited by the two-dimensional screen. The Full Dome Conference allows people in different locations to connect three-dimensionally in an immersive, virtual augmented space without the necessity of virtual reality glasses, a device that decouples the user from their physical surrounding.

A part of the Full Dome Conference is a physical installation, in which the conference participant is present, the rest of the space will be virtually extended as a roundtable, where the other participants (located in maximal three other different locations) are seated.

The Full Dome Conference is a novel combination of available technologies (web cameras, beamers, software and a dome shaped projection screen), and relies on ultra-realistic computer visualization and high-speed internet.

Conference Room Set Up (Physical)

The conference room consists out of a framed FullDome screen with ca. 2.5 m diameter, a projection system (beamers), a local server, web cameras, a Chroma Key screen wall, a 5.1 audio system, a user interface (e.g. laptop), a rounded shaped table (preferably covered with a colored screen for composting reasons) and a chair.

The conference room is an indoor installation with a height of ca. 2.6 meters. The FullDome screen is installed with an angle (preferred between a range of ca. 10 and ca. 160 degrees, particularly preferred between a range of ca. 15 degrees and 45 degrees, very particularly preferred of ca. 30 degrees) to allow for an immersive conference experience. The participant sits at a fixed position at the rounded table to ensure a correct video capture. Three web cameras are fixed on the table at a certain angle to capture the participant from the left, the front and from the right.

The rounded chroma key screen wall is located behind the participant. It is necessary for compositing within the virtual environment in real time. The table is shaped as a quarter circle and will be virtually extended to a complete round table during the conference.

Conference Room Layout (Virtual)

The virtual conference room layout consists out of four physical conference rooms in different locations, digitally mapped together in any virtual scene (meeting room, beach, moon, etc.) within the gaming software Unreal Engine or a similar software (e.g. Unity) on a remote server.

The precise geometrical positioning ensures the correct optical perspective and the visual contact between all conference participants. The conference rooms are mapped around the virtual round table, which gives the participants the impression of sitting next to the other participants within a virtually extended space.

Video Call Input/Output

The video conference is carried out as a MultiCam call in Zoom or a similar software. Each participant participates in a video call using three web cameras via "multiple camera setup" in Zoom or a similar software, installed on the local user interface (e.g. laptop).

The 12 video signals (three for each participant) are processed on a remote server and composed around the virtual round table within the pre-selected virtual scene within the gaming software Unreal Engine or a similar software (e.g. Unity). The combination of the virtual projection of the input videos around the virtual round table is different for each participant that has a fixed place at the virtual table. This can be facilitated individual for each participant in four different Unreal Engine scenes.

Rendering Techniques

The photo realistic virtual environment for the virtual round table is created in Unreal Engine, using photometry, HDRI maps or 3d modeling.

Rendering Output:
- direct fisheye lens support by Unreal Engine in real time
- pre rendered 5 cubic maps and post processing for cinematic background
- final output resolution up to 4096×4096 px, 30 or 60 frames per second Incoming video calls are processed in Unreal Engine in real time translation onto the Unreal Engine compositing panel. The Chroma Key background within the incoming video call is hereby removed with the Unreal Engine Composure plugin. The final output is placed as a video avatar inside the 3D virtual environment on a remote server.

In the next step the processed 3D environment including the other participants is projected on the FullDome screen in front of the local participant in real time. The dome projection mapping for each conference room is achieved with the Scalable Display Manager for Unreal Engine on the local server.

Manual for Full Dome Conference Application

After installing and connecting all projectors, cameras and audio devices:
1. Run Unreal Engine multi session server scene and select virtual environment.
2. Send Full Dome Conference invitation to remote participants via email.

3. Remote participants connected to the main server, now all participants can see each other in virtual environment.
4. Participants can make a virtual presentation (e.g. slideshow or additional video content) during the immersive conference.
5. Participants can visually share real physical objects by demonstrating these objects to the camera in front of them on the table.
6. Dynamic change of the virtual environment (e.g. to the interieur design of an architectural project) during the conference to expand the boundaries of a presentation for a greater collective experience.
7. Each participant can also choose their own unique virtual environment, independently of other participants.
8. Log out of the Full Dome Conference by closing Unreal Engine.

The aspects according to the invention will be explained in more detail below by means of examples, without being limited to these examples.

DETAILED DESCRIPTION OF THE INVENTION

In a preferred embodiment the invention relates to a conference room for a spatial visual telecommunication and/or conducting virtual conferences for 2-8 users (max. 2 users in each location) seated in 2-4 different locations comprising: a video capture device, a visual display device, an audio system, a user interface, a local server, a remote server, a composting software. In particular, the conference room has a dome and a base. The dome is placed on the base at an angle of inclination. Furthermore, the invention relates to a system that comprises at least two of the conference rooms described above and can generate a virtual conference room therefrom. In addition, the invention relates to a method for the generation of a virtual conference.

Figure 1:
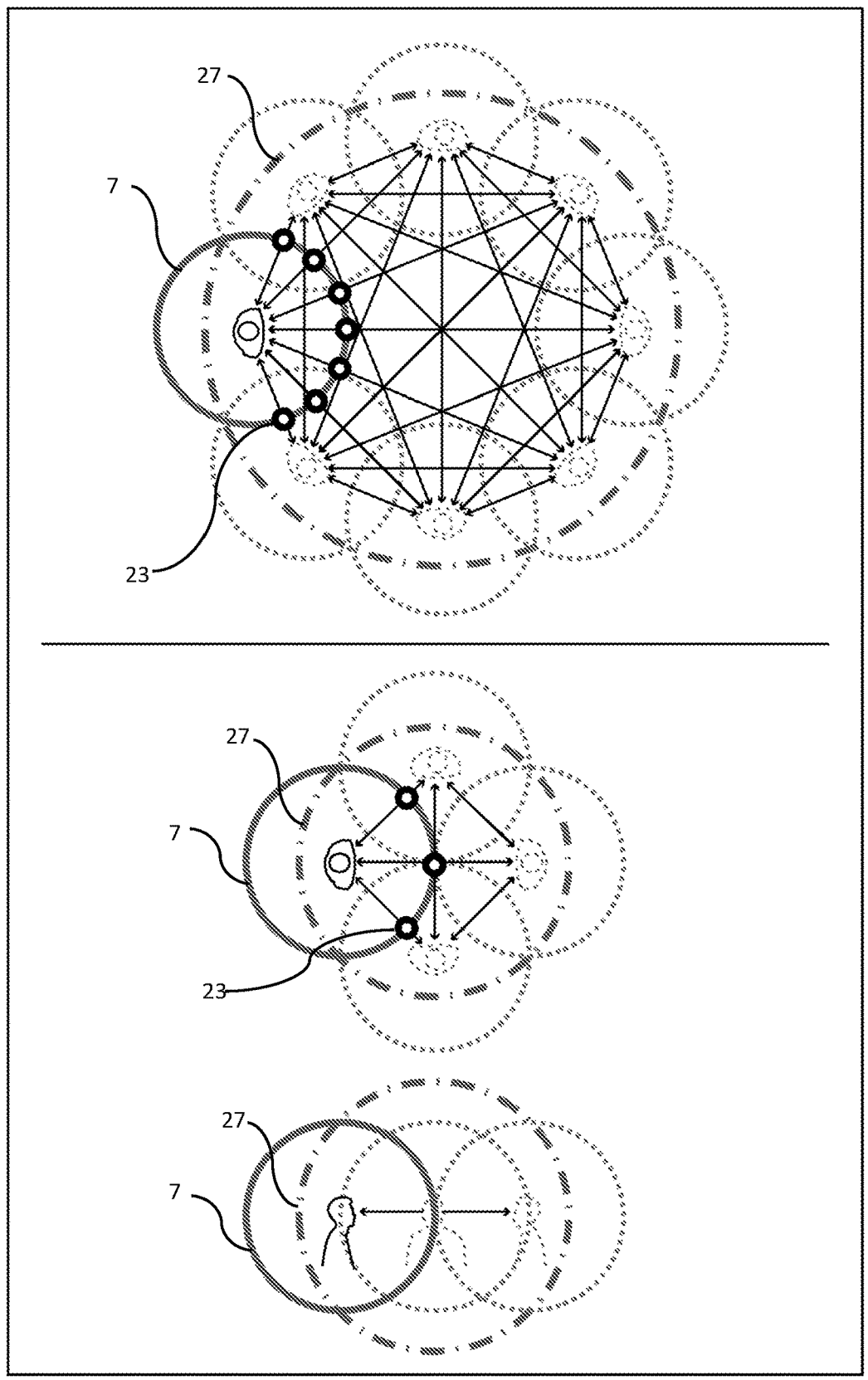
FIG. 1 is a diagram of the virtual interconnection of local and remote spaces within the spherical visual displays.

FIG. 1 is a diagram showing local 7 and remote spaces within spherical visual displays that surround each user or multiple users and that can be virtually interconnected (visually and acoustically) in order to generate a spatially immersive and interactive experience 27 for all participating users in different locations who are using the same software and hardware setup. The scale of the setup can vary: the smallest setup allows for 2-8 users (max. 2 users in each location) to interact in 2-4 different locations whereby the bigger the setup is, the more users in more locations can participate.

Figure 2:
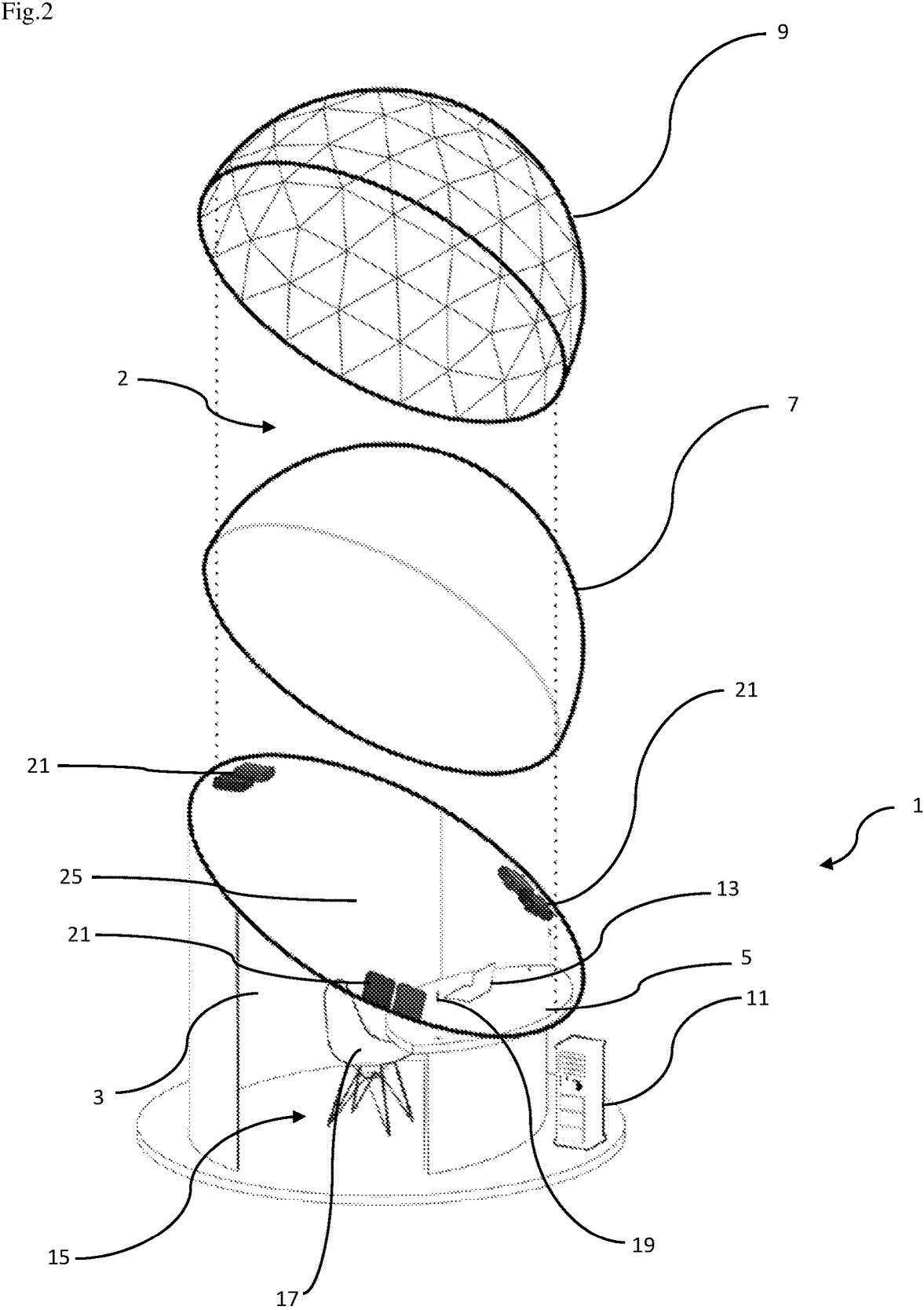
FIG. 2 is an exploded-view drawing of a preferred conference room.

FIG. 2 illustrates a preferred conference room 1 in an exploded view. The conference room 1 comprises preferably a base 3 and a dome 2, wherein the dome 2 consists of two parts. Namely, the dome 2 preferably comprises an aluminum support frame 9 and a projection (or LED) screen 7. The base 3 is preferably designed as a hollow cylinder, in particular as an obliquely cut circular cylinder, which has a laterally placed opening 15. The opening 15 is preferably to be understood as an entrance and/or an exit for a person using the conference room 1. In further embodiments, the conference room 1 may have a further opening in the hollow cylinder, preferably located on the opposite side of the hollow cylinder with respect to the opening 15. An inwardly facing side of the base 3 is preferably provided with a chroma key screen 25. Furthermore, the conference room 1 comprises an audio system, which preferably comprises at least a microphone and speakers for surround sound. Furthermore, the conference room 1 comprises 4-8 projectors 21, which are configured to display a video signal on the projection screen 7. Additionally, the conference room 1 comprises a local server 11 configured to be in data communication with a remote server, wherein the local server having access to the audio system and/or the projectors 21. The conference room 1 has also a user interface (or a port to connect a user interface), wherein the user interface is preferably a laptop 13. A laptop 13 is suitable for capturing, for example, control commands and/or communication commands. A chair 17 and a rounded shaped table (preferably covered with a green screen for composting reasons) 5 are also set up in the conference room 1.

Figure 3:
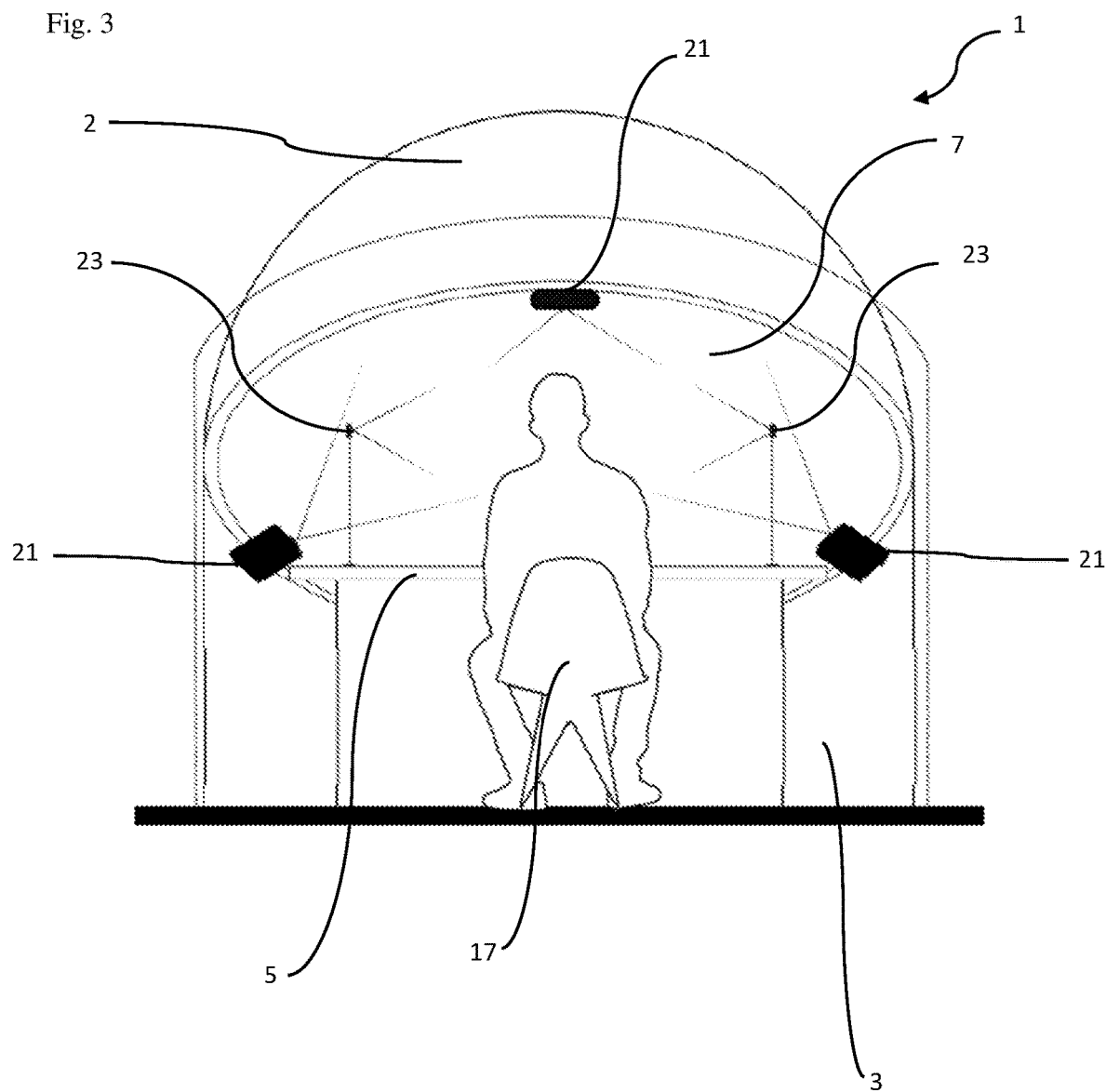
FIG. 3 is a schematic representation of a preferred conference room in a cross-section from rear side.

FIG. 3 shows a cross-sectional view of a preferred conference room 1 from a rear side. The preferred conference room 1 has a dome 2 as well as a base 3. Furthermore, a chair 17 and a table 5 are arranged within the conference room 1. Preferably, a person can sit on the chair 17 to have a comfortable and spatially defined position during a conference. For displaying visual content, projectors 21 are mounted above and next to the person at the edge of the dome 2, which can beam an image and/or a video onto a projection screen 7. In addition, the conference room 1 has three cameras 23 that can preferably record a person sitting on a chair 17 from three different defined view angles (left, front, right). The captured images can be assembled into a three-dimensional image by data processing units contained, for example, in a remote server.

Figure 4:
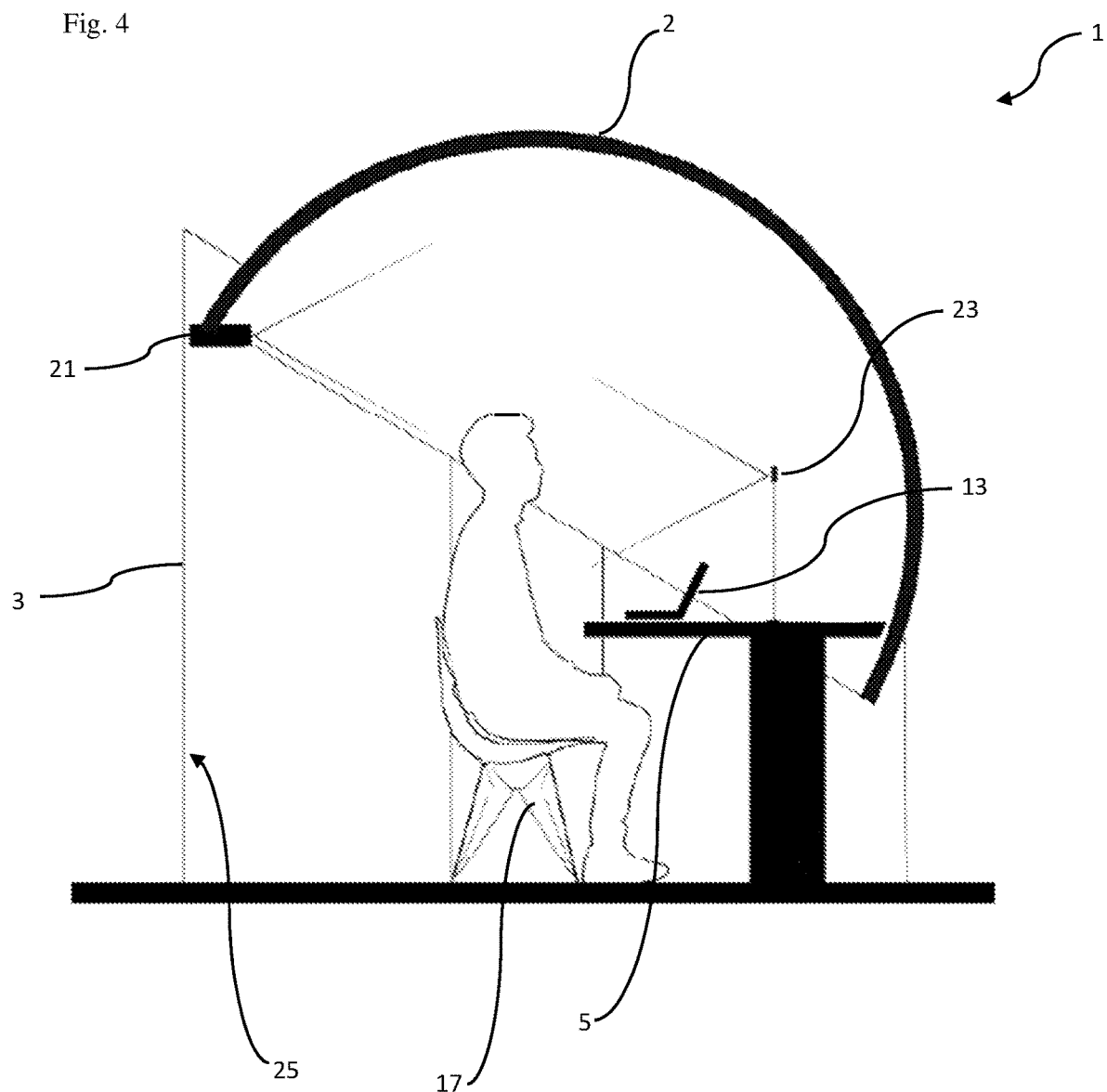
FIG. 4 is a schematic representation of a preferred conference room in a cross-section from a side perspective.

FIG. 4 shows a cross-sectional view of a preferred conference room 1 from a side perspective. The preferred conference room 1 comprises a dome 2 and a base 3. The dome 2 is angled at an angle of approx. 30°. This allows the projectors 21, which are located along the edge of the dome and around a person using the conference room 1, to project an image and/or a video onto a projection screen 7 inside the dome 2. This enables an advantageous spatial representation without the use of VR glasses as known in the state of the art. A chroma key screen 25 is located behind the person and the chair 17 on the inward facing side of the base 3. Using the chroma key screen 25, an algorithm can recognize a person in a captured image, extract the person from the image, and embed the person in a virtual environment and/or virtual conference room. In further embodiments, however, artificial intelligence algorithms that do not require the use of such a chroma key screen 25 may be used to embed a person into a virtual environment. In such cases, the chroma key screen 25 is omitted from the preferred conference room 1. Furthermore, a table 5 and a chair 17 are included as well as a user interface such as a laptop 13 in the preferred conference room 1. The laptop 13 is used for example for command input and/or a chat function. Among other things, files contained on the laptop 13 can also be shared with conference participants. Three video cameras in total 23 are preferably placed at the head height of a person in order to achieve optimal focusing of this person.

Figure 5:
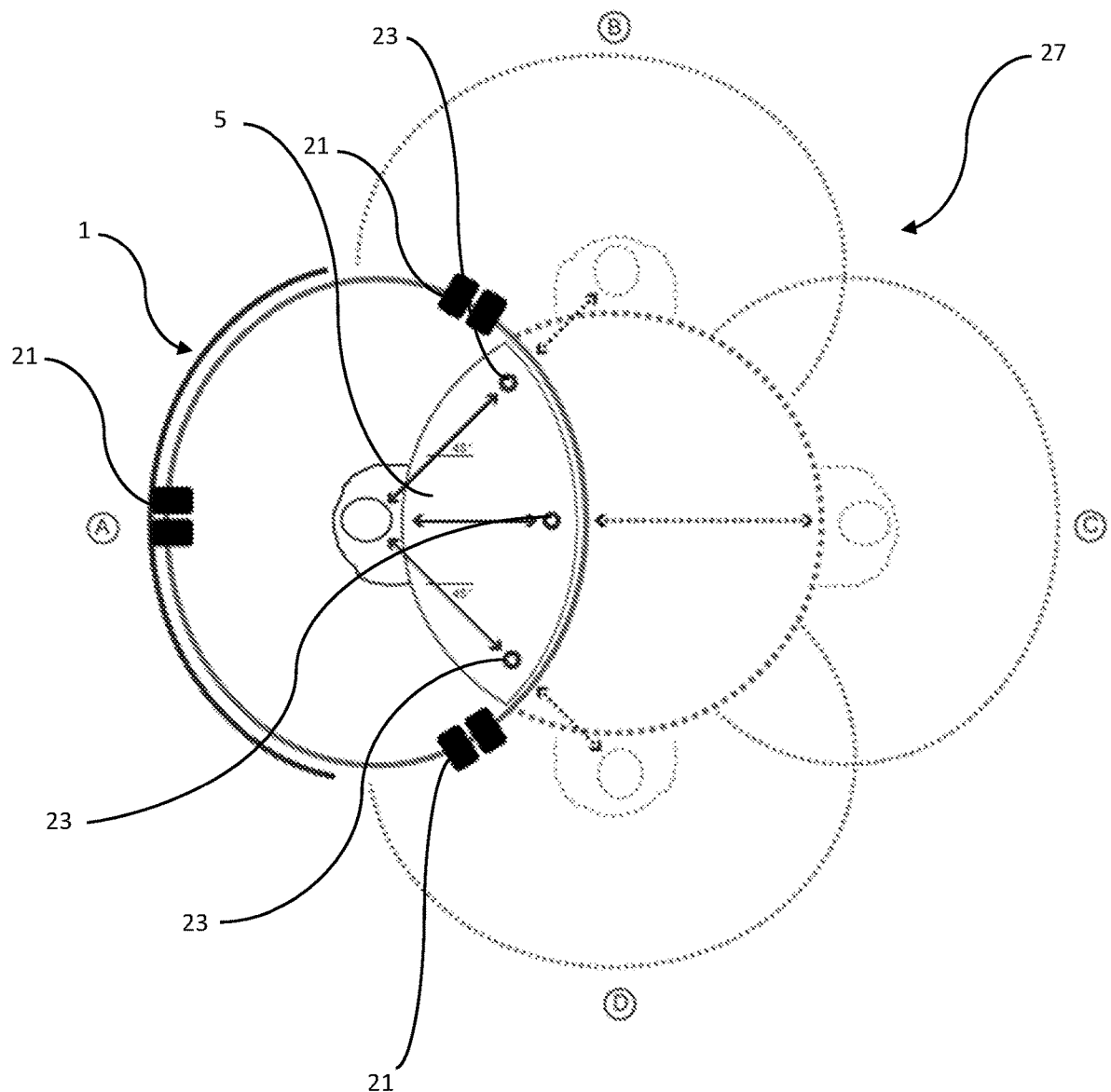
FIG. 5 is a schematic representation of a virtual conference room in top view.

FIG. 5 is a schematic representation of a virtual conference room in top view. The virtual conference room is preferably a (virtual) combination of individual physical conference rooms 1, with the conference rooms 1 being combined in a complementary manner. Preferably the virtual conference room is generated by a remote server that is in data communication with preferably four physical conference rooms 1 (A, B, C, D). The remote server processes the captured video and audio data of the conference rooms 1 and combines them into an overall consolidated (virtual) room. Then, the processed data is sent back to the physical conference rooms 1 for simultaneous playback via an audio system and/or a projector 21. Each physical conference room 1 has a table 5, wherein the table 5 preferably represents a partial element of a circle. The various conference rooms 1 (A, B, C, D) are virtually aligned so that they overlap. The partial elements of the tables 5 thus form a virtual round table. In the overall structure, a virtual room is thus created, which allows the participating persons a spatial and realistic representation of the participants and the conference.

Figure 6:
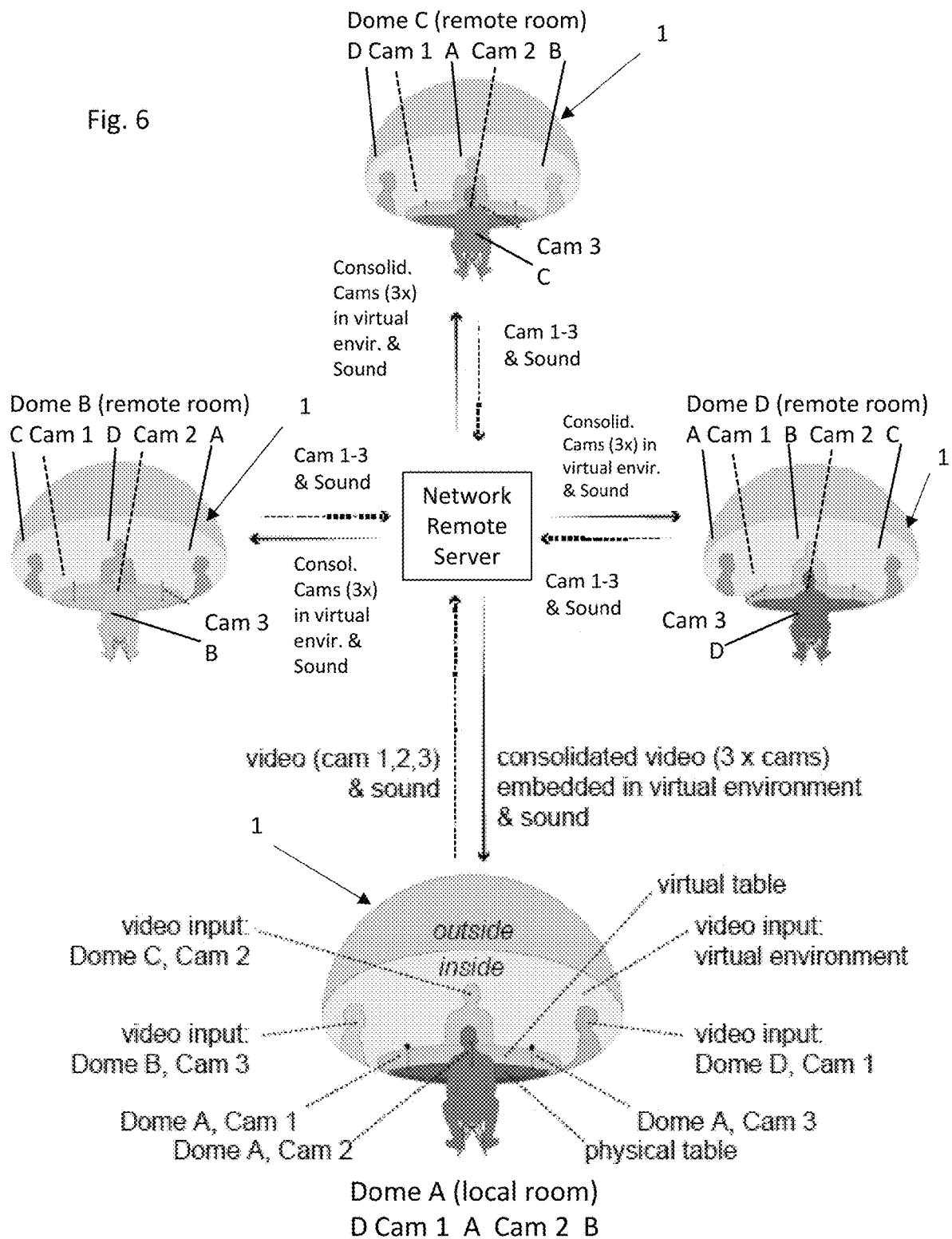
FIG. 6 is a diagram of a preferred system architecture.

FIG. 6 is a diagram of a preferred system showing various data streams. The system comprises four physical conference rooms 1. The conference rooms/are referred to as "Dome A", "Dome B", "Dome C", "Dome D", each of which is in data communication with a remote server. The remote server is arranged to create a common virtual conference room from the four parallel conference rooms 1, each of which is in a different physical location.

LIST OF REFERENCE SIGNS 1 conference room
2 dome
3 base
5 table
7 projection screen
9 aluminium frame
11 local server
13 laptop
15 opening
17 chair
19 speaker
21 projector
23 camera
25 chroma key screen
27 virtual immersive conference room

The invention claimed is:

1. A teleconferencing system, the system comprising:
a remote server;
a set of two or more separate conference rooms, each separate conference room having a specified capacity of occupants, each of the two or more separate conference rooms located in a different location, each of the two or more separate conference rooms comprising:
a video capture device, a visual display device, an audio system, a user interface, a local server, and a dome with a inner spherical surface positioned on a base above the occupants and oriented at an inclined angle;
wherein the visual display device is configured to display at least one of a mapped video or an image signal on the inner surface of the dome;
wherein the video capture device is configured to generate at least one of a video or an image signal from inside each of the separate conference rooms;
wherein in each of the separate conference rooms, the audio system is configured to capture an audio signal from inside of the conference room and to output a surround sound audio signal within the conference room;
wherein the local server is configured to process, store, and transmit data;
wherein the local server is in data communication with the video capture device, the display device, the audio system, the user interface, and the remote server; and
wherein the remote server is configured to combine the captured video, image signals, and audio signals from each of the two or more separate conference rooms to produce in real time a single virtual conference feed shown as the mapped video or image signal on the inner spherical surface of the dome of each of the separate two or more conference rooms that provides an immersive and spatially visual spherical display surrounding the specified number of occupants.

2. The system according to claim 1 wherein the dome further comprises a support frame; and
wherein the inner spherical surface of the dome functions as a projection screen for the visual display device.

3. The system according to claim 2 wherein the support frame is aluminum.

4. The system according to claim 1 wherein the visual display device comprises a plurality of projectors, wherein the plurality of projectors are configured to project the mapped video or image onto a projection screen formed from the inner surface of the dome.

5. The system according to claim 1 wherein each base is formed as a hollow cylinder, the base having an inwardly facing side and an outwardly facing side;
wherein the inwardly facing side has a chroma key screen;
wherein the base has a top that is an obliquely cut circular cylinder that supports the dome; and
wherein the base has an opening for entering the conference room.

6. The system according to claim 1 wherein the video capture device comprises a set of cameras; and
wherein the video capture device has at least three cameras which are orientated to capture a defined area within the conference room from different viewing angles.

7. The system according to claim 1 wherein the audio system comprises at least a microphone and a set of speakers that produce surround sound.

8. The system according to claim 1 wherein the user interface comprises a device selected from the group consisting of tablet computer, laptop, smartphone, cell phone or desktop computer.

9. The system according to claim 1 wherein each of the two or more separate conference rooms further comprise a table and a chair, wherein the table is shaped as a quarter circle.

10. The system according to claim 1 wherein the dome has a diameter of 2.5 m and is installed at an angle of 30 degrees.

11. The system according to claim 1 wherein the surround sound audio signal is produced by a 5.1 audio system.

12. The system according to claim 1 wherein the dome is hung from a ceiling or walls at the different locations.

13. A method for a spatial visual telecommunication and conducting virtual conferences, the method comprising:
capturing video, image signals, and audio data with the video capture device and the audio system in the at least two separate conference rooms;

transmitting the captured data from the at least two separate conference rooms to a server;

combining the captured video, image signals, and audio signals from each of the at least two separate conference rooms to produce in real time a single virtual conference feed;

transmitting the single virtual conference feed from the server to each client of the at least two separate conference rooms;

displaying the single virtual conference feed as the mapped video or image signal on the inner spherical surface of each of the at least two separate conference rooms that provides an immersive and spatially visual spherical display surrounding the occupants in each of the at least two separate conference rooms.

14. The method of claim 13 wherein the displaying of the single virtual conference feed is with the plurality of projectors in each of the separate at least two conference rooms.

15. The method of claim 13 further comprising orienting at least three cameras of the video capture device in the at least two conference rooms to capture a defined area within each of the conference rooms from different viewing angles.

\* \* \* \* \*